July 27, 1954  A. FISCHER  2,684,599
TRANSMISSION

Filed May 7, 1952  2 Sheets-Sheet 1

INVENTOR.
ALBERT FISCHER
BY
ATTORNEY.

July 27, 1954  A. FISCHER  2,684,599
TRANSMISSION
Filed May 7, 1952  2 Sheets-Sheet 2
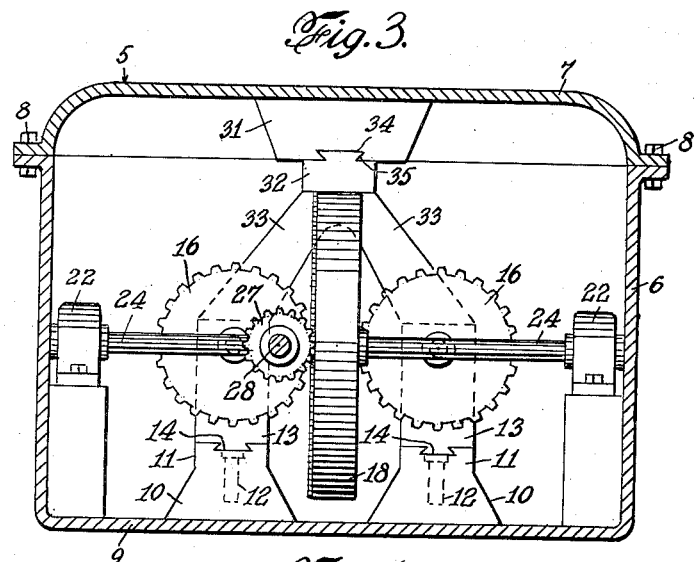
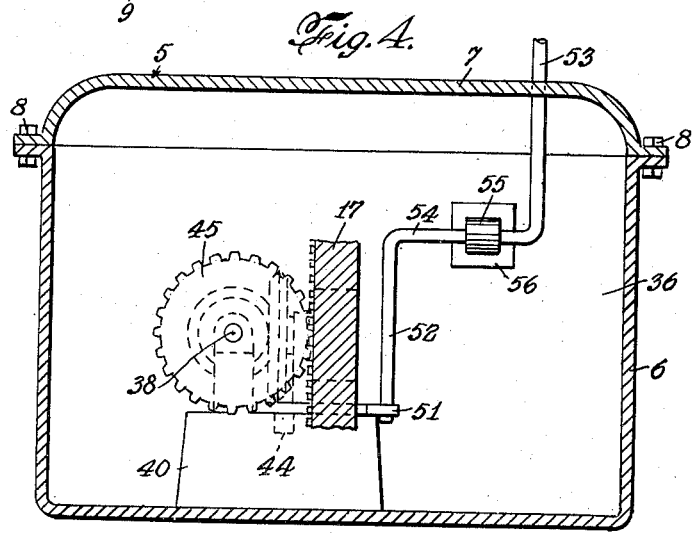
INVENTOR.
ALBERT FISCHER
BY
ATTORNEY.

Patented July 27, 1954

2,684,599

UNITED STATES PATENT OFFICE 2,684,599

TRANSMISSION

Albert Fischer, Calgary, Alberta, Canada

Application May 7, 1952, Serial No. 286,501

5 Claims. (Cl. 74—351)

1

The present invention relates to transmissions and force transmitting apparatus and machines, and particularly to a force transmission apparatus without coupling.

The main object of my invention is to provide a transmitting apparatus for mechanical forces that is capable of altering the speed of rotation of the driven shaft with respect to the drive shaft in a smooth manner without abrupt changes.

Another object of the invention is to have a transmission wherein a bearing block for certain of the gears involved is shiftable in order to engage the gears with various portions of corresponding gears in order to effect change in speed.

A further object is to have a transmission of the character indicated that is capable of various speeds and also of reversing the drive at will.

It is also an object to have such a transmission apparatus that does not require a large number of spur gears and pinions or planetary gearing with many different couplings of the gears occurring, but is instead relatively simple as a whole.

A practical object is, of course to have a transmission mechanism of the mentioned form that is convenient to use, effective in operation and not likely to get out of order.

Other objects and advantages of my invention will appear more fully in detail as the specification proceeds.

In order to facilitate ready comprehension of this invention for a proper appreciation of the salient features thereof, the invention is illustrated on the accompanying drawings forming part hereof, and in which:

Figure 3 is a transverse section taken on line 3—3 in Figure 2; and

Figure 4 is another section taken on line 4—4 in Figure 2.

Throughout the views, the same reference numerals indicate the same or like parts.

Figure 1:
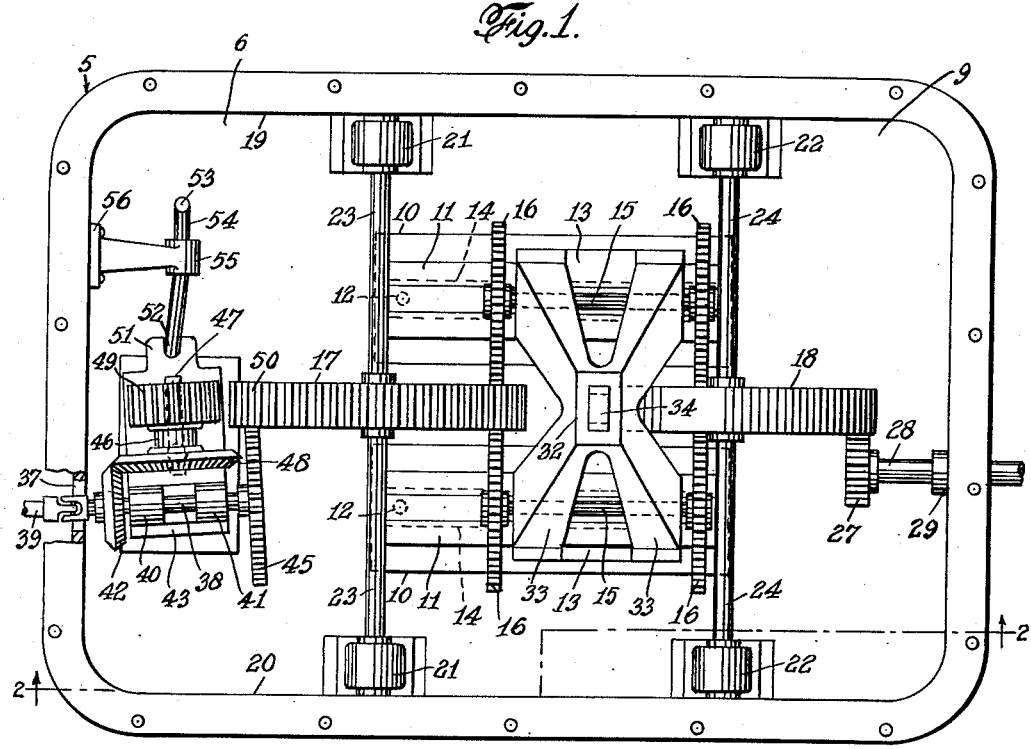
Figure 1 is a plan view of a transmission mechanism made according to the invention and embodying the same in a practical form, the casing of the apparatus having the top or cover removed to disclose the parts.
Figure 2:
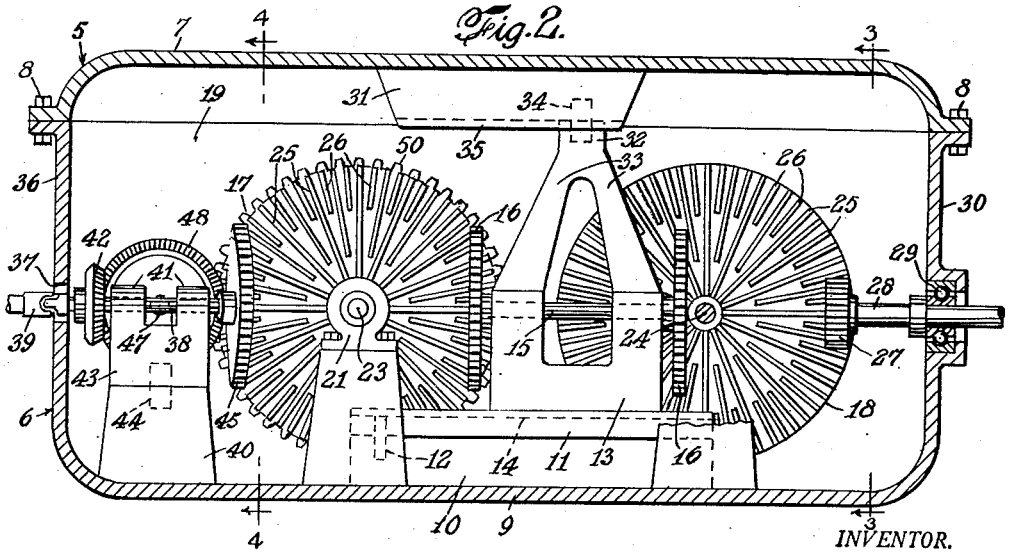
Figure 2 is a longitudinal section through the casing of the mechanism shown in Figure 1 as taken on line 2—2.

In transmissions and force transmitting mechanisms, especially such as used on automobiles, it is quite usual to have very complex gearing such as planetary gearing, a large number of gears and pinions of various sizes, and considerable coupling and uncoupling of the various gears and pinions occurring. It is practically always

2 necessary to shift to neutral before any gear shifting may occur, and frequently, gears are stripped and other damage easily results from any errors in manipulation. Many other disadvantages are encountered in ordinary transmissions, and many makeshifts have, of course been resorted to, but the demand is yet for a perfected transmission.

Upon considering this problem, it has occurred to me that a transmission mechanism to be effective and not likely to get out of order should have its gears meshing the major portion of the time and should not have to uncouple to any great extent as now necessary in known transmissions. As a result, I have succeeded in producing a special transmission mechanism along the lines already alluded to, as will now be set forth in detail hereinafter.

Hence, in the practice of my invention, and referring also again to the drawings, a casing or gear box, generally indicated at 5 consists of a lower casing member 6 and a top or cover 7 normally secured to casing 6 by means of bolts 8, 8. Upon the bottom 9 of the casing is fixed a rail bed 10 on each side of the longitudinal center of the same and upon each bed is mounted a rail 11 and retained by a pin 12 at one end to the bed involved so that the rail is held in operative position upon its bed. On each bed is slidably mounted a bearing block 13 that is dovetailed at 14 into its bed to ensure straight line sliding movement of the bearing along its rail 11. In the upper portions of bearing blocks 13, two parallel shafts 15, 15 are rotatably mounted, each having a gear 16 at each end of spur type and meshing with a pair of larger gears 17, 18 about to be described.

Within the two side walls 19 and 20 of the casing are located alined bearings 21, 21 and 22, 22 supporting a pair of gear shafts 23, 24 upon which the two gears 17 and 18 are fixed, both gears having series of alternately long and short radial teeth upon both sides thereof with which gears 16 mesh. Long teeth 25 and short teeth 26 on gears 17 and 18 are similar in spacing so that gears 16 will mesh therewith far or near from the shafts 23 and 24 for variable speed transmission from the gear 18 through gears or pinions 16 and shafts 15 to gear 17. The first mentioned gear 18 has a further drive pinion or gear 27 meshing with the teeth 25 and 26 on one side thereof, this pinion being mounted on drive shaft 28 rotating in end bearing 29 in end wall 30 of the gear casing 6 and extending outside to be driven by an engine or motor not shown.

Upon the underside of the casing cover 7 is fixed a slide guide 31 beneath which a slide member 32 is arranged to slide, this member forming the upper end of a bridge having a plurality of legs 33, 33 extending down to and being secured upon the bearing blocks 13, 13 to assist in guiding the bearings in their sliding movement along rails 11, 11 during operation. An upward extension 34 from bridge top 32 extends up into the longitudinal ways 35 of guide 31 and thereby guides the bridge in its movement.

At the opposite end wall 36 of casing 6 is a second end opening 37 for a power delivery shaft 38, to which may be connected a universal joint 39 connected to an outside take-off shaft, not shown. Within the end wall 36 is fixed a bearing stand 40 upon casing bottom 9 with bearings 41, 41 supporting shaft 38, and upon the outer end thereof, but within wall 36 is fixed a bevel pinion or gear 42. Bearings 41 are integral with a swiveling bearing block 43 mounted on stand 40 and capable of swiveling on a pivot pin 44 for a purpose that will be explained. Upon the inner end of shaft 38 is mounted a spur gear 45 meshing with one side of the gear 17 and forming the driven gear in forward rotation or drive for shaft 38.

When reverse rotation or drive is desired, other means driven by gear 17 are engaged. Thus, upon bearing block 43 is fixed a third bearing 46 for a transverse shaft 47 upon which is fixed a bevel gear 48 meshing with bevel pinion 42. Upon the other end of shaft 47 is fixed a spur pinion 49, while the gear 17 is provided upon its periphery with corresponding gear teeth 50 to mesh with pinion 49. The arrangement is such that the bearing block 43 swiveling on pin 44 may alternatively engage the gear 45 with the side teeth of gear 17 in one position or in the other position will engage pinion 49 with the spur teeth 50 of gear 17 for reverse drive of shaft 38. In order to control reversal for the drive manually, a bifurcated extension 51 upon bearing block 43 is engaged by a depending leg 52 of a lever 53 having a horizontal portion 54 riding in a bearing 55 secured by its base 56 to casing 6 by screws or bolts. When the lever 53 is rocked in one direction, the lower end 52 shifts fork 51 to engage gear 45 with the side teeth of large gear 17, while rocking lever 53 in the other direction will shift lower end 52 and fork 51 to mesh pinion 49 with the peripheral teeth 50 on the same gear 17, reversing the drive of delivery shaft 38.

It will be noted that the bearing blocks 13, 13 with the two shafts 15, 15 and their end gears 16, 16 upon each are slidably shiftable along rails 11, 11 as units, so that when the blocks shift in one direction, the one gear 16 at one end of each shaft 15 meshes with two lengths of teeth 25 and 26 on one of gears 17 or 18, while the other end gear 16 at the other end of each shaft 15 meshes only with the inner ends of longer teeth 25 of the other one of gears 17 or 18. When the blocks 13 are shifted along the rails toward the other end, the opposite condition exists, the gears 16 meshing with the side teeth near the center or shaft 23 or 24 of one gear 17 or 18 while the other gears 16 mesh with the outer portions of teeth 25 and 26 of the other of gears 17 or 18, providing reduction or increase in the speed of rotation transmitted from shaft 28 to delivery shaft 38. The means for thus shifting the bearing blocks may be selected from any known form of gear shift levers. The lever 53 may be used to disengage the gear 45 from the side teeth 25 of gear 17 and at the same time also disengage gear 49 from gear 17 itself if moved just enough to effect such simultaneous disengagement, when for any reason it is desired to shift to idle or neutral position. Various levers and shifting means of known kind may be used thus to shift the gears and also to shift the bearing blocks along the rails for shifting the apparatus into neutral or into operation and for varying the speed of operation during the running of the mechanism at will.

From the foregoing, it will be evident that the invention makes it possible to shift to various speeds without uncoupling or necessarily shifting to neutral for each change, and that speeds may be changed smoothly and without sudden changes, and that it is also easily possible to reverse rotation when desired.

Manifestly, variations may be resorted to, and parts and features may be modified or used without others within the scope of the appended claims.

Having now fully described my invention, I claim:

1. A transmission mechanism including a support having two pairs of transversely alined opposite side bearings, a pair of shafts rotatably mounted in parallel in said side bearings, a gear mounted upon each shaft having side teeth upon the side thereof directed radially inward toward the shaft of each gear, an end bearing in one end of the support having a drive shaft rotatable therein and extending out to be driven by a prime mover, a gear upon the inner end of the drive shaft meshing with the side teeth of one gear relatively nearer to said end bearing, a take-off gear meshing with the side teeth on the other gear and having a shaft for delivering the power transmitted by the mechanism as a whole, a movable bearing for the last mentioned shaft, a bearing bed upon the support with a rail supported on said bed, a bearing block slidably mounted on the rail and having a shaft rotatable transversely to the first mentioned two shafts, a gear upon each end of the latter shaft so disposed that one gear meshes with the side teeth of one of said first mentioned gears and the other gear meshes with the side teeth of the other of said first mentioned gears, and means for guiding said bearing block in sliding movement along the rail.

2. A transmission mechanism according to 1, wherein the movable bearing has a second transverse shaft rotatable on the same and provided on one portion with a bevel gear and on another portion with a spur gear, a row of peripheral gear teeth on the one gear having the side teeth remote from the end bearing of said support, and wherein the delivery shaft has a bevel pinion meshing with the bevel gear and the bearing has a pivot pin engaging with said support for swiveling movement of said movable bearing to alternatively mesh one gear upon the delivery shaft with the side teeth of said gear having the side teeth adjacent to said delivery shaft or the gear upon the transverse shaft also having the bevel pinion with the peripheral teeth on said gear having the side teeth, with a manually operated lever for shifting the movable bearing about its pivot pin to effect forward or reverse driving of said delivery shaft.

3. A transmission mechanism according to claim 1, wherein the two gears on the two parallel shafts have side teeth on both sides of each, and two bearing blocks are slidably mounted upon two rails on said support, and wherein gears meshing with the side teeth on both of the first mentioned gears are fixed on both ends of two longitudinal shafts upon said bearing blocks, one gear upon one end of each transverse shaft meshing with the side teeth of one of the first mentioned gears and the other gear on each transverse shaft meshing with the side teeth of the other of said first mentioned gears on both sides thereof.

4. A transmission mechanism according to claim 3, including a pivot pin connecting each rail with the support adjacent one end of each rail in order to retain the same in position.

5. A transmission mechanism according to claim 3, wherein the means for guiding the bearing block in sliding movement includes upon the support an upper guide above the bearing blocks and a bridge fixed upon said bearing blocks with guide whereby to guide the bearing blocks in a top portion slidably engaging with said upper movement.

References Cited in the file of this patent

| Number | Name | Date |
|---|---|---|
| 2,033,850 | Roberts | Mar. 10, 1936 |
| 2,594,687 | Scott | Apr. 29, 1952 |